US010843360B1

(12) United States Patent
Sirles

(10) Patent No.: US 10,843,360 B1
(45) Date of Patent: Nov. 24, 2020

(54) FRUIT CUTTING APPARATUS

(71) Applicant: Michelle J. Sirles, Alto Pass, IL (US)

(72) Inventor: Michelle J. Sirles, Alto Pass, IL (US)

( * ) Notice: Subject to any disclaimer, the term of this patent is extended or adjusted under 35 U.S.C. 154(b) by 0 days.

(21) Appl. No.: 16/884,910

(22) Filed: May 27, 2020

Related U.S. Application Data

(60) Provisional application No. 62/976,034, filed on Feb. 13, 2020.

(51) Int. Cl.

| | |
|---|---|
| ***A47J 43/18*** | (2006.01) |
| ***A47J 17/18*** | (2006.01) |
| ***A47J 17/14*** | (2006.01) |
| ***B26D 3/26*** | (2006.01) |
| ***B26D 3/18*** | (2006.01) |
| ***B26D 1/00*** | (2006.01) |
| ***B26D 5/38*** | (2006.01) |
| ***B26D 7/01*** | (2006.01) |
| ***B26D 5/00*** | (2006.01) |

(52) U.S. Cl.
CPC ............. *B26D 3/26* (2013.01); *B26D 1/0006* (2013.01); *B26D 3/18* (2013.01); *B26D 5/005* (2013.01); *B26D 5/38* (2013.01); *B26D 7/01* (2013.01); *B26D 2001/004* (2013.01); *B26D 2210/02* (2013.01)

(58) Field of Classification Search
CPC ........ B26D 1/0006; B26D 3/16; B26D 5/005; B26D 5/38; B26D 7/01; A47J 43/0711; A47J 43/0722; A47J 43/18; A47J 17/14–18
See application file for complete search history.

(56) References Cited

U.S. PATENT DOCUMENTS

| | | | | |
|---|---|---|---|---|
| 3,138,186 A * | 6/1964 | Laudien | B26D 1/25 | 83/411.1 |
| 4,095,751 A * | 6/1978 | Artin | A47J 43/046 | 222/410 |
| 4,320,680 A * | 3/1982 | de la Cruz | B26D 3/26 | 83/411.7 |
| 4,442,764 A * | 4/1984 | Bos | A47J 17/18 | 99/633 |
| 2006/0065134 A1* | 3/2006 | Wong | A47J 17/16 | 99/584 |
| 2007/0022860 A1* | 2/2007 | Chow | B26D 5/10 | 83/651 |

(Continued)

*Primary Examiner* — Michael A Laflame, Jr.
(74) *Attorney, Agent, or Firm* — Dale J. Ream

(57) ABSTRACT

A fruit cutting apparatus includes an appliance housing having a bottom wall a body portion extending upwardly therefrom. A cutting chamber is coupled to the appliance housing and includes a continuous side wall defining an open top and bottom. A rotating platform assembly is coupled to the appliance housing and has a second portion extending upwardly into the cutting chamber, the rotating platform assembly including a support surface having a plurality of prongs configured to impale and secure the fruit piece. A cutting blade is positioned in the body portion and is slidably movable between deployed and retracted configurations. An input assembly enables selection of a cutting style, each selection being associated with programming instructions that cause a processor to selectively actuate the blade to deploy, orient its blade tip, and actuate the rotating platform to rotate the fruit piece as it is cut as selected.

20 Claims, 8 Drawing Sheets

(56) References Cited

U.S. PATENT DOCUMENTS

| | | | | |
|---|---|---|---|---|
| 2009/0080285 | A1* | 3/2009 | Brotz | B01F 15/00467 366/272 |
| 2010/0005978 | A1* | 1/2010 | Hoffman | B26D 3/26 99/538 |
| 2012/0177790 | A1* | 7/2012 | Tuchrelo | B26D 3/282 426/231 |
| 2012/0240792 | A1* | 9/2012 | Clarke | A47J 19/06 99/509 |
| 2014/0374519 | A1* | 12/2014 | Davis | A47J 43/046 241/101.8 |
| 2017/0332483 | A1* | 11/2017 | Fujii | H05K 3/303 |
| 2018/0279819 | A1* | 10/2018 | Tuchrelo | B26D 3/282 |
| 2020/0189141 | A1* | 6/2020 | Mann | B26D 7/01 |

* cited by examiner

FRUIT CUTTING APPARATUS

REFERENCE TO RELATED APPLICATIONS

This application claims the priority of provisional patent application U.S. Ser. No. 62/976,034 filed Feb. 13, 2020 titled Fruit Cutting Apparatus and which is incorporated herein by reference in its entirety.

BACKGROUND OF THE INVENTION

This invention relates generally to kitchen appliances and, more particularly, to a fruit cutting apparatus having a single cutting blade that may be oriented and operated under software control to prepare an apple or similar spherical fruit according to many user-selectable cutting patterns without having to change blade assemblies.

Encouraging people to eat more fruit is desirable for the promotion of good health. For instance, eating more apples, peaches, pears, grapefruits, or the like is desirable, especially in modern times where obesity and inactivity are publicized with greater regularity. Unfortunately, preparation of an apple into apple slices, wedges, and other configurations takes time and planning and, as a result, causes many people to pass over natural fruit in favor of more convenient packaged snacks that may be less healthy overall.

Various kitchen appliances have been proposed in the art for cutting an apple or similar spherical fruit into wedges, slices, cubes, rings, spirals, or slaw. Although presumably effective for their intended purposes, such appliances tend to be very large or require changing out blade assemblies corresponding to a desired cutting style.

Therefore, it would be desirable to have a fruit cutting apparatus that enables a home user to select from a variety of cutting styles and to cut the fruit using a single blade that may be operated under program control. Further, it would be desirable to have a fruit cutting apparatus having structures that orient and extend a blade and that rotates the fruit in order to cut a fruit into wedges, slices, cubes, rings, spirals, or slaw.

SUMMARY OF THE INVENTION

A fruit cutting apparatus for cutting a spherical-shaped fruit piece according to a preferred embodiment of the present invention includes an appliance housing having a planar bottom wall and a body portion extending upwardly from the bottom wall. A cutting chamber is coupled to the appliance housing and includes a continuous side wall that defines an interior area having an open top and bottom. A rotating platform assembly has a first portion coupled to the appliance housing and a second portion extending upwardly in communication with the interior area of the cutting chamber, the rotating platform assembly including a support surface having a plurality of prongs extending upwardly from the support surface and configured to impale the fruit piece. A cutting blade is positioned in the body portion and is slidably movable between deployed and retracted configurations. An input assembly enables selection of a cutting style, each selection being associated with programming instructions that cause a processor to selectively actuate the blade to deploy, orient its blade tip, and actuate the rotating platform to rotate the fruit piece as it is cut as selected.

Therefore, a general object of this invention is to provide a fruit cutting apparatus for cutting a generally spherical fruit piece into wedges, slices, cubes, rings, spirals, or slaw without having to change blades or blade assemblies.

Another object of this invention is to provide a fruit cutting apparatus, as aforesaid, having a single blade and a rotating platform that under software control and, with user selection, can cut the fruit piece as selected.

Still another object of this invention is to provide a fruit cutting apparatus, as aforesaid, that is operable to orient a blade tip and actuate a blade arm between retracted and deployed configurations according to programming instructions associated with a user selection of a cutting style.

Yet another object of this invention is to provide a fruit cutting apparatus, as aforesaid, that more economical than a fruit cutting apparatus that requires multiple blade assemblies.

Other objects and advantages of the present invention will become apparent from the following description taken in connection with the accompanying drawings, wherein is set forth by way of illustration and example, embodiments of this invention.

Figure 1:
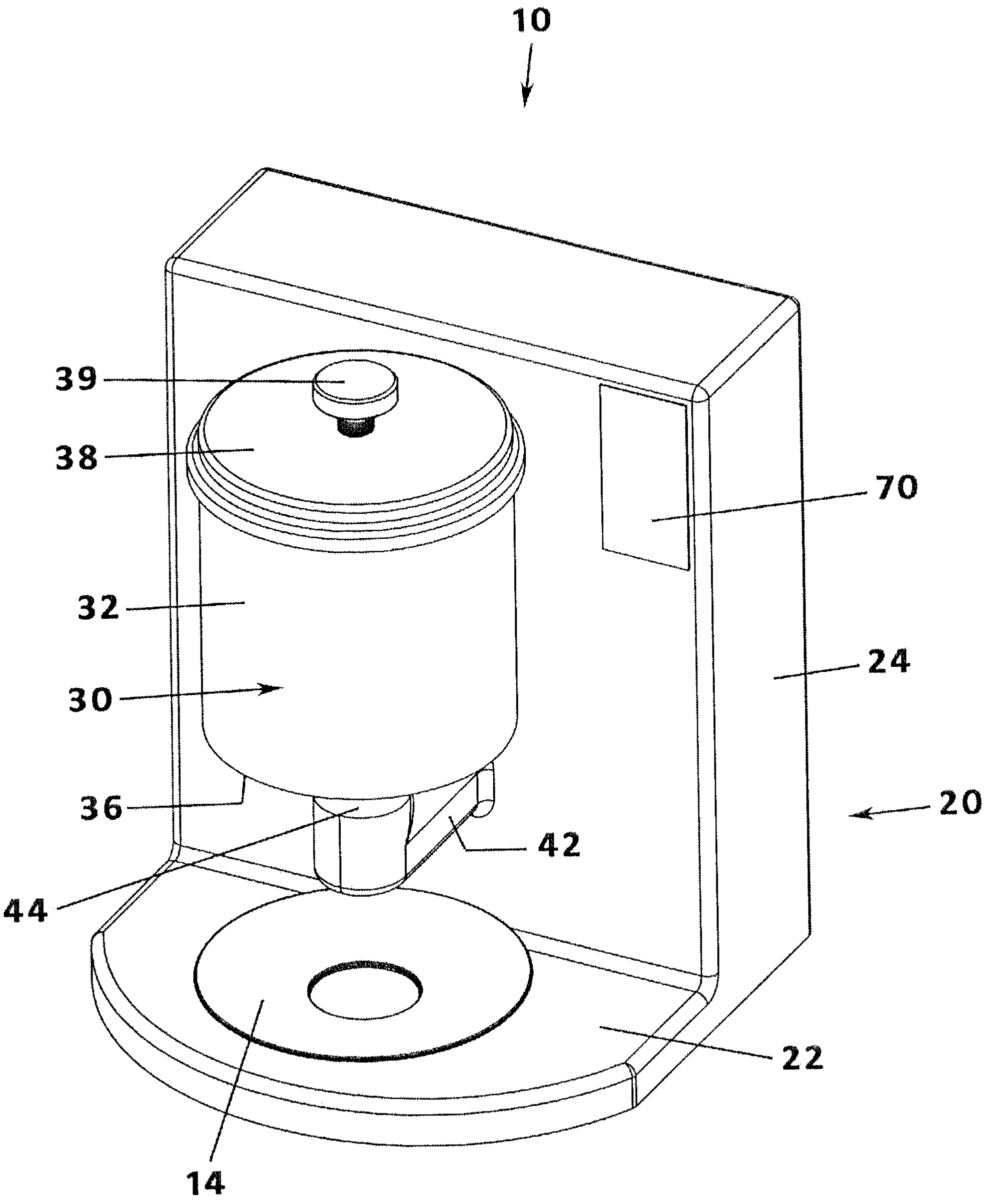
FIG. 1 is a perspective view of a fruit cutting apparatus according to a preferred embodiment of the present invention.
Figure 2:
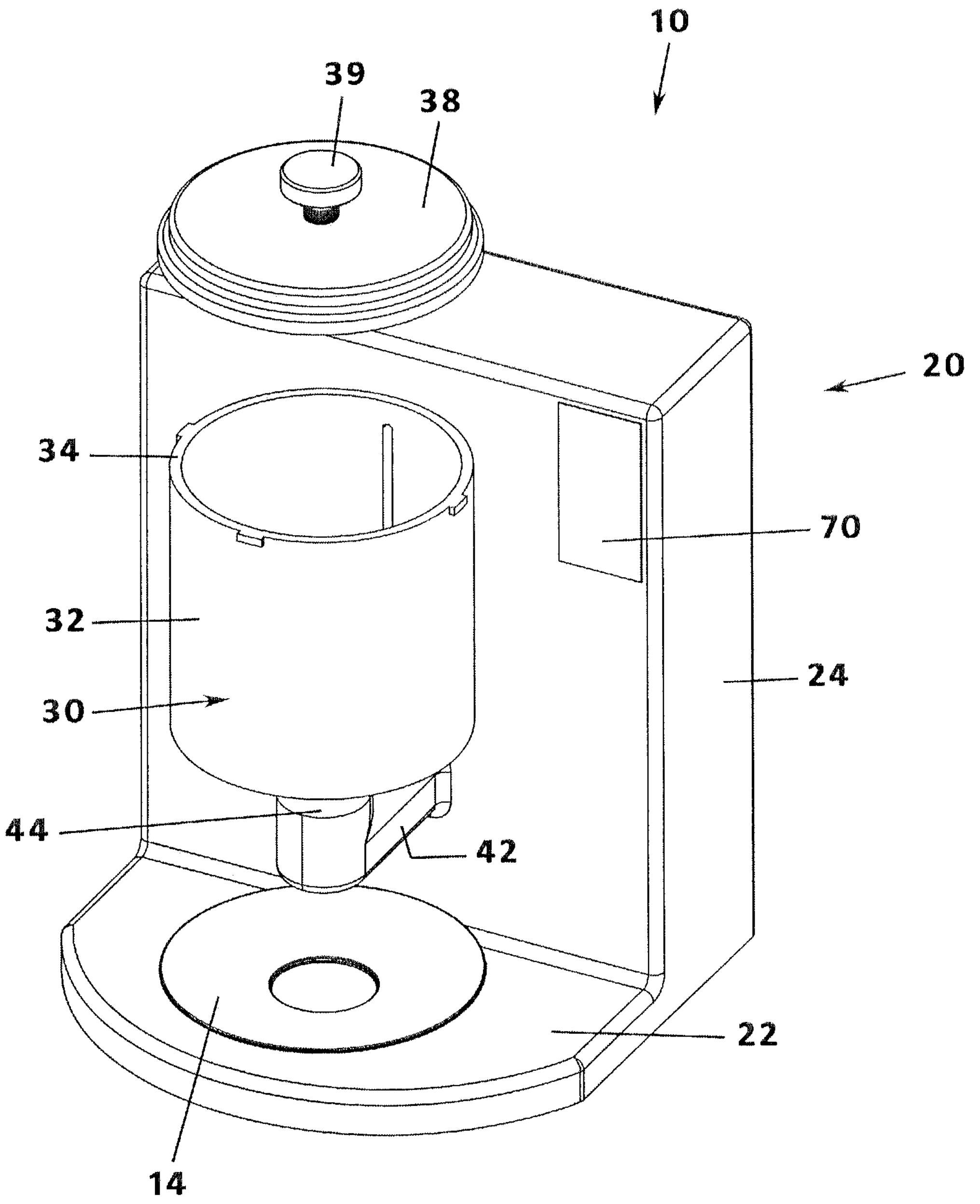
FIG. 2 is another perspective view of a fruit cutting apparatus as in FIG. 1 with a lid exploded from a cutting chamber.
Figure 3A:
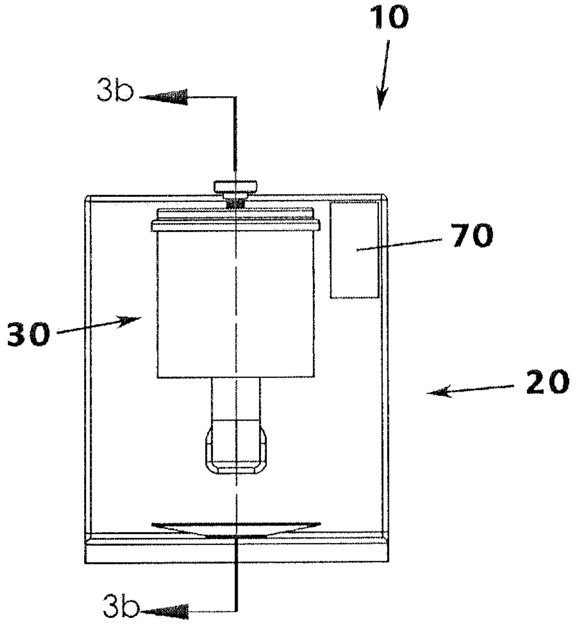
Figure 3B:
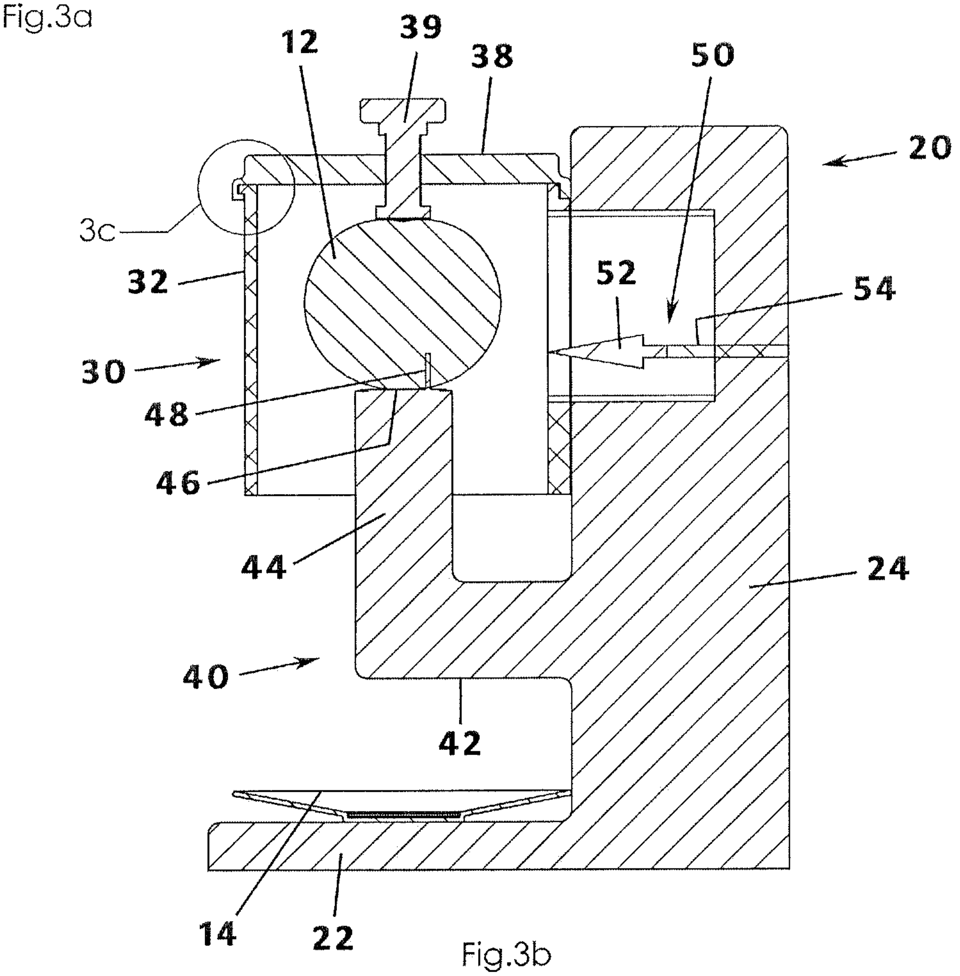
Figure 3C:
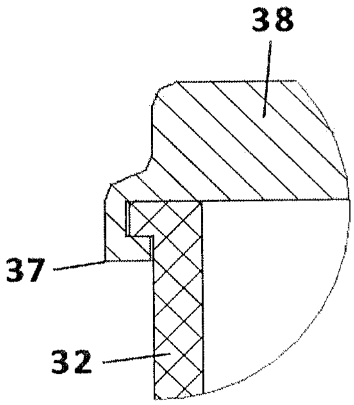
Figure 4A:
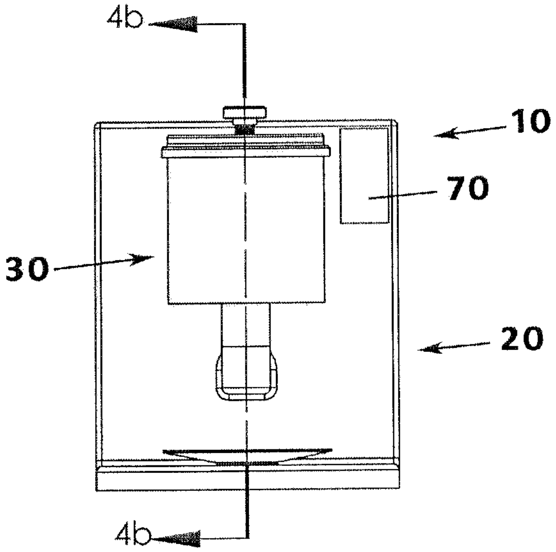
Figure 4B:
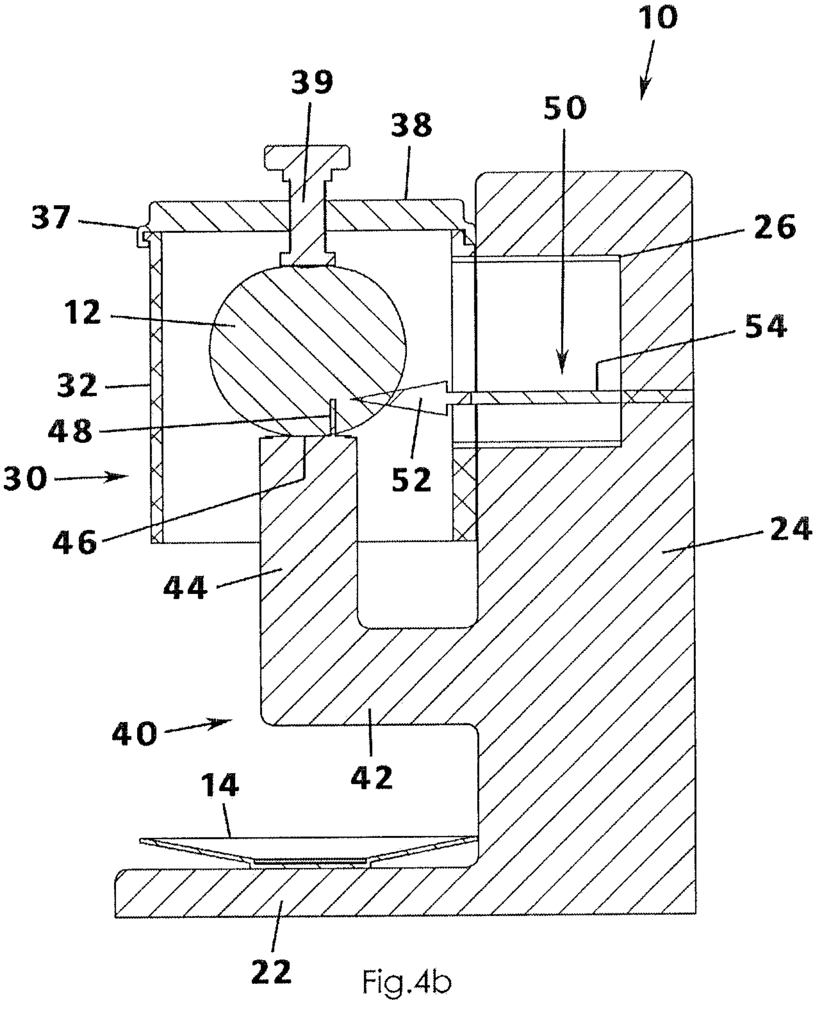
Figure 5A:
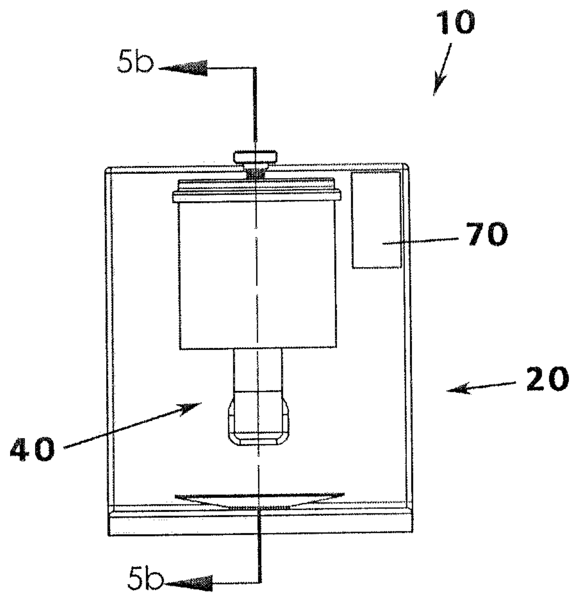
Figure 5B:
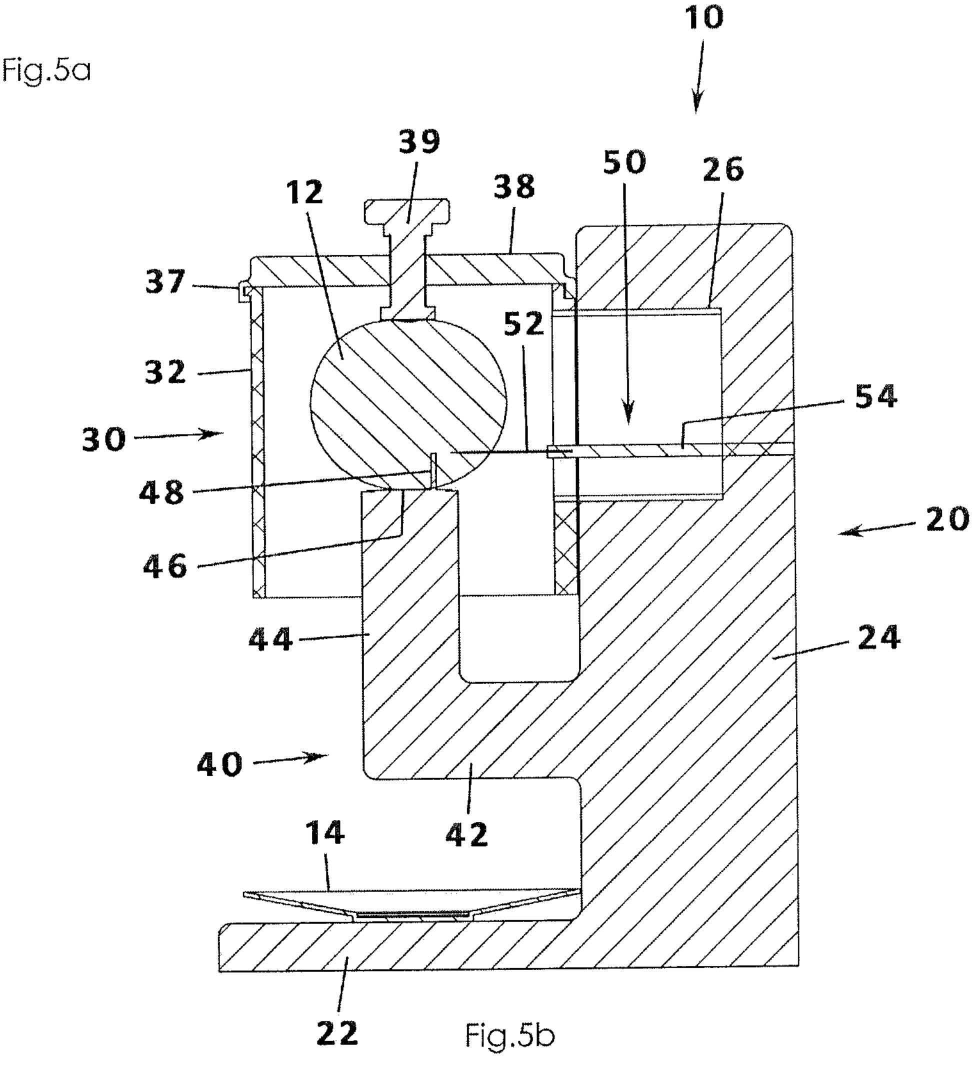
Figure 6A:
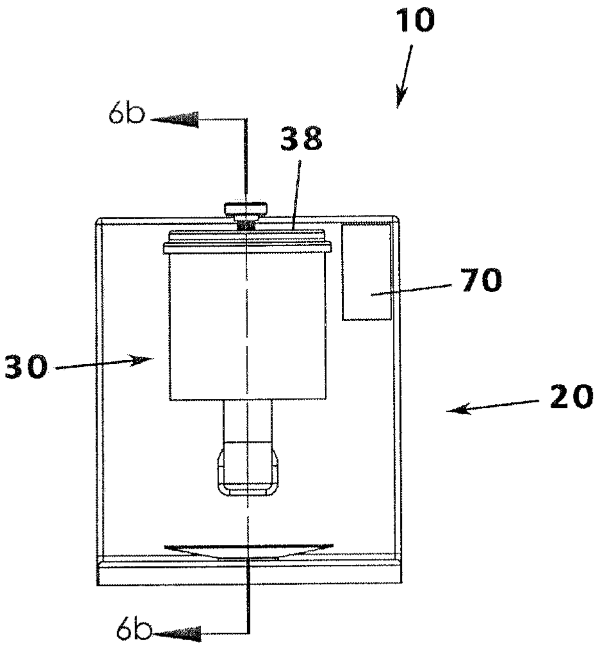
Figure 7:
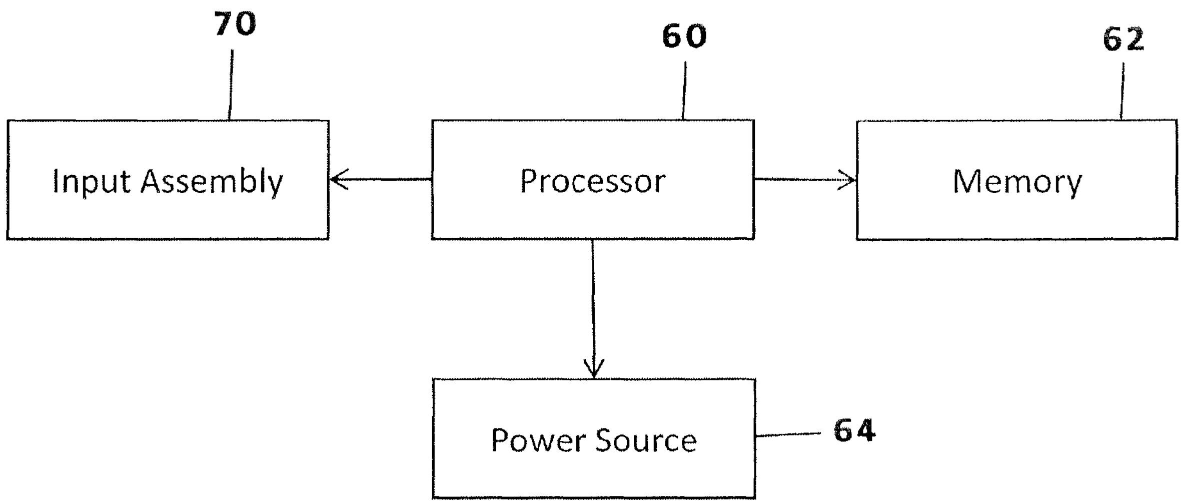

FIG. **3*a* is a front view of the fruit cutting apparatus as in FIG. 1**;

FIG. **3*b* is a sectional view taken along line 3*b*-3*b* of FIG. 3*a***, illustrating the cutting blade arm in a retracted configuration;

FIG. **3*c* is an isolated view on an enlarged scale taken from FIG. 3*b***;

FIG. **4*a* is a front view of the fruit cutting apparatus as in FIG. 1**;

FIG. **4*b* is a sectional view taken along line 4*b*-4*b* of FIG. 4*a***, illustrating the cutting blade arm in an extended configuration and the blade tip is rotated to a vertical configuration;

FIG. **5*a* is another front view of the fruit cutting apparatus as in FIG. 1**;

FIG. **5*b* is a sectional view taken along line 5*b*-5*b* of FIG. 5*a***, illustrating the cutting blade tip rotated to a horizontal configuration;

FIG. **6*a* is another front view of the fruit cutting apparatus as in FIG. 1**;

FIG. **6*b* is a sectional view taken along line 6*b*-6*b* of FIG. 6*a*, illustrating an auxiliary cutting member in an extended configuration; and FIG. 7** is a block diagram illustrating the electronic components of the present invention.

DESCRIPTION OF THE PREFERRED EMBODIMENT

A fruit cutting apparatus according to a preferred embodiment of the present invention will now be described in detail with reference to FIGS. 1 to 7 of the accompanying drawings. The fruit cutting apparatus 10 includes an appliance housing 20, a cutting chamber 30, a rotating platform assembly 40, a cutting blade 50, and electronics and programming.

The fruit cutting apparatus 10 is a kitchen appliance and, preferably, has a relatively small footprint so as not to take up a significant volume on a user's kitchen counter. Although the construction and principles set forth in the present specification are applicable to both commercial and home embodiments, the preferred embodiment is to enable home user's to prepare apples and similar generally spherical or frusto-spherical fruits in many styles, such as in the form of wedges, slices, cubes, rings, spirals, or slaw. The range of fruits that may be used with the present invention is only limited by the selected size of the cutting chamber—a choice that may be made by a manufacturer or consumer. For instance, it is contemplated that the present invention may be used to cut apples, pears, grapefruit, cantaloupe, peaches, and the like. It will be understood, of course, that term "fruit" may also include the class of vegetables as well and that the mechanics of the apparatus described herein may be adapted to hold and cut vegetables as well.

The fruit cutting apparatus 10 includes an appliance housing 20 having a bottom wall 22 and a body portion 24 extending upwardly from the bottom wall 22. The bottom wall 22 forms a lower platform having a planar configuration upon which a plate or bowl may be supported when receiving pieces of fruit cut by the cutting blade 50 as will be described later. The body portion 24 includes side walls and a top wall that together define an interior space that may hold the electronics and cutting blade 50 as will be described below.

The cutting chamber 30 may include a continuous side wall 32 having a circular or cylindrical configuration and that defines an interior area although other shape configurations may also work. The side wall 32 of the cutting chamber 30 also defines an open top 34 and an open bottom 36. The cutting chamber 30 may include a lid 38 having a structure complementary to a configuration of an upper edge of the side wall 32 so as to be selectively coupled to or removed therefrom. More particularly, the lid 38 may be secured to the side wall 32, such as with a clasp 37, complementary thread patterns or with another fastener, while the cutting blade 50 is cutting the fruit piece 12. In addition, the lid 38 may include a spring-loaded arm 39 designed to hold the fruit piece 12 in position atop the support platform 46 as will be described later. The lid 38 provides a safety feature so that a user's hands cannot become cut by the cutting blade 50 and so that the cut fruit slices do not become contaminated by outside hands or articles.

Figure 6B:
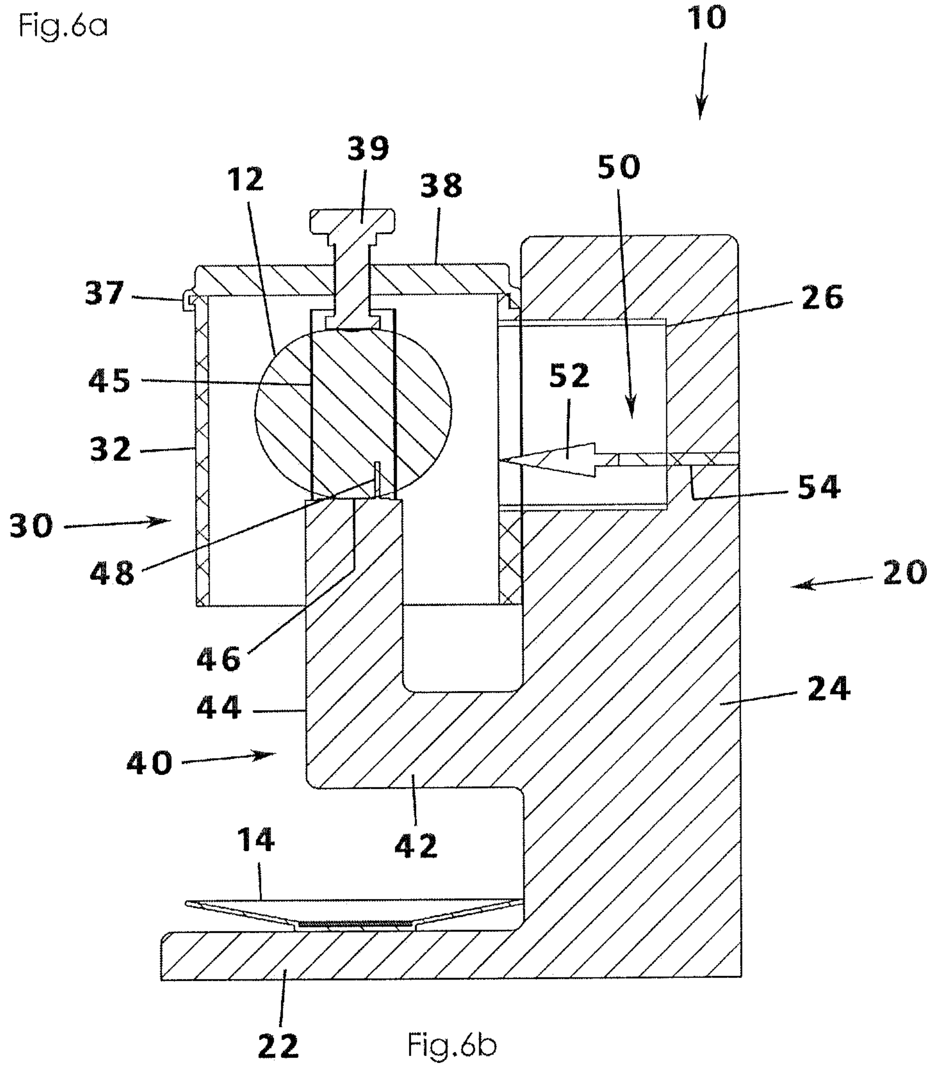

The fruit cutting apparatus 10 includes a rotating platform assembly 40 having structures for holding a fruit piece 12 in a predetermined position and that enables the fruit piece 12 to be rotated in predetermined retraction and orientation according to programming instructions associated with selectable cutting styles. More particularly, the rotating platform assembly 40 includes a first portion 42 coupled to the body portion 24 of the appliance housing 20. The first portion 42 may be a rod, bracket, or similar mounting fastener. Preferably, the first portion 42 is parallel to the bottom wall 22 of the appliance housing 20, e.g. horizontal relative to a countertop surface. The rotating platform assembly 40 includes a second portion 44 coupled to an inner end of the first portion 42 and extending upwardly and perpendicular to the first portion 42. Preferably, the second portion 44 includes a support platform 46 at its terminal end that is positioned in the interior area of the cutting chamber, the support platform 46 being configured to support and secure a fruit piece 12 thereon. The support platform 46 may include at least one but, preferably, a plurality of prongs 48 extending upwardly and away from the support platform 46, the prongs 48 being sufficiently sharp and pointed so as to impale and secure a fruit piece 12 thereon. The prongs 48 also correctly position a fruit piece to be cut or sliced according to the predetermined programming instructions associated with a cutting style selected by a consumer, as will be described later. It is understood that the second portion 44 may have a cylindrical configuration that defines an imaginary longitudinal axis about which the second portion 44 may rotate when electrically actuated. In this way, the fruit piece 12 may be rotated about the longitudinal axis as it is being sliced by the cutting blade 50. It is understood that actuation of rotation of the second portion 44 is in association with the received input instruction indicative of a selected style of cutting of the fruit piece 12. In an important aspect, the continuous side wall of the second portion 44 or an auxiliary cutting member 45 of the rotating platform assembly 40 may be slidably and longitudinally extended and rotated about the support platform 46 so as to cut the center core out of the fruit piece 12 secured on the prongs 48 (FIG. 6*b*). More particularly, the auxiliary cutting member 45 may be moved slidably from a retracted position inside the second portion 44 to an extended position extending upwardly and away from the second portion 44 and then rotated under program control when actuated to bore a core out of the fruit piece 12. Again, this action of the auxiliary cutting member 45 is associated with the specific received input associated with coring the fruit piece 12.

In another aspect, the cutting blade 50 includes a blade tip 52 mounted at a distal end of a blade arm 54. The entire or a substantial portion of the cutting blade 50 may be moved, when electrically actuated, between a (1) retracted configuration extending away from the cutting chamber 30 (or even inside the interior area of the appliance housing 20 or in an electronics box 26) (FIG. 2) and a (2) deployed configuration in which the blade tip 52 is positioned inside the cutting chamber (FIG. 4*b*) where it may bear against the fruit piece 12 whereby to cut or slice the fruit piece 12 according to predetermined actuation instructions associated with user input data as will be described later. It is understood that the cutting blade 50 may be actuated to move in/out between the retracted and deployed configurations and also to be swiveled or rotated so that the blade tip 52 is moved between a horizontal orientation (FIG. 5*b*) and a vertical orientation (FIG. 4*b*) depending on a user's selection of cutting style. Still further, the cutting blade 50 may be configured to move vertically (e.g. to move up or down).

As stated earlier, the present invention is configured to cut fruit into wedges, slices, cubes, rings, spirals, or slaw without changing blade assemblies. By contrast, the fruit cutting apparatus 10 is a smart electronic device that uses electronic technology in a unique manner to enable the universal functionality described above. The electronic components of the present invention may be mounted in an electronics box 26 within the body portion 24 of the housing 20. To do this, the fruit cutting apparatus 10 includes a processor 60 (also referred to as a controller or microprocessor) capable of executing programming instructions and actuating other electronic members such as the cutting blade 50 and rotating platform assembly 40 as described above. Further, electronics to accomplish the cutting functions includes a non-volatile memory 62 in data communication with the processor 60, whether with wires, in an integrated circuit, or wirelessly. The memory 62 includes data structures for holding data (such as input data) and a plurality of predetermined programming instructions capable of being executed by the processor 60.

In a related aspect, an input assembly 70 is in data communication with the processor 60 and is configured to enable a user to select a desired cutting style. The input assembly 70 may include a plurality of buttons—each being associated with indicia indicative of a cutting style or may include a touch screen and a display with digital indicia (not shown). In addition, it is contemplated that the input assembly 70 may include voice recognition technology for selecting a desired cutting style. Specifically, the voice recognition technology may a voice recognition software module and a microphone capable of listening to receive human voice input data. A power source 64, such as AC electricity or a battery, may be electrically connected to the processor 60. It is also understood that the electronics discussed above could be replaced with static electrical circuitry such as to run faster or else be implemented via software having programming. Again, the programming instructions are associated with each possible cutting style. In other words, a respective programming instruction (which may include a plurality of sub-instructions), when executed by the processor 60, may include multiple incremental and sequenced rotations of the rotatable platform assembly 40 along with actuation of the blade tip 52 to the horizontal or vertical configuration and actuation of the blade arm 54 between the retracted and deployed configurations. It is understood that the number of rotations of the rotating platform assembly 40 may be associated with the number of slices desired. Each respective programming instruction or plurality of sub-instructions is associated with a selected cutting style and is different from any other programming instruction or associated set of instructions. One or more programming instructions may also be associated with an input selection of coring the center of the fruit piece via movement of the side wall of the second portion 44 of the rotating platform assembly 40 as described above.

In use, the fruit cutting apparatus 10 may be positioned atop a countertop in a consumer's home and may be used in the manner of other appliances in the home. More particularly, a bowl or plate 14 may be situated on the bottom wall 22 beneath the open bottom 36 of the cutting chamber 30. After removal of the lid 38, the fruit piece 12, such as an apple, may be placed atop the prongs 48 extending from the support platform 46. Then, the user may select, using the input assembly 70, the cutting style that is desired. Once selected, the input selection triggers execution of associated programming for the processor 60 to actuate appropriate blade orientations, blade deployment, and rotations of the rotatable platform assembly 40 so as to cut the fruit as selected. As cuts are made the cut fruit pieces fall via gravity (or upon manual removal if incomplete) onto the plate 14 for consumption by the user.

It is understood that while certain forms of this invention have been illustrated and described, it is not limited thereto except insofar as such limitations are included in the following claims and allowable functional equivalents thereof.

The invention claimed is:

1. A fruit cutting apparatus for cutting a spherical-shaped fruit piece, comprising:

an appliance housing that includes a bottom wall having a planar and horizontal surface and a body portion that extends upwardly from said bottom wall and that defines an interior space;

a cutting chamber having a continuous side wall that defines an interior area and that defines an open top and an open bottom;

a rotating platform assembly having a first portion coupled to said body portion of said appliance framework and a second portion extending upwardly from said first portion in communication with said interior area of said cutting chamber, said rotating platform assembly including a prong extending upwardly from said terminal end that is operable to impale the fruit piece;

a cutting blade slidably movable between a retracted configuration displaced from said interior area of said cutting member and a deployed configuration in communication with said interior area of said cutting chamber;

a processor;

a non-volatile memory in data communication with said processor and configured to store data and programming executable by said processor, wherein said data and said programming includes predetermined actuation instructions associated with a plurality of cutting styles;

an input assembly in data communication with said processor and configured to receive user input data associated with a respective cutting style; and programming stored in said non-volatile memory that, when executed by said processor, causes said processor to actuate said cutting blade and said rotatable platform according to said received user input data.

2. The fruit cutting apparatus as in claim 1, wherein:

said cutting blade defines a horizontal axis and is configured to rotate about said horizontal axis between horizontal and vertical orientations when actuated; and said programming, when executed by said processor, causes said processor to actuate said cutting blade to rotate between said horizontal and vertical orientations according to said received user input data.

3. The fruit cutting apparatus as in claim 1, wherein said input assembly includes a touch screen or a keypad in electrical communication with said processor for receiving input data associated with a style of cutting.

4. The fruit cutting apparatus as in claim 1, wherein said input assembly includes a single selection button in electrical communication with said processor for receiving input data associated with a style of cutting.

5. The fruit cutting apparatus as in claim 1, wherein said input assembly includes a voice recognition module in electrical communication with said processor for receiving input data associated with a style of cutting.

6. The fruit cutting apparatus as in claim 1, wherein said input assembly is positioned on an exterior surface of said body portion of said appliance housing.

7. The fruit cutting apparatus as in claim 1, wherein said cutting blade is positioned in said interior space of said body portion in said retracted configuration and is positioned in said interior area of said cutting chamber in said deployed configuration.

8. The fruit cutting apparatus as in claim 1, wherein said processor is positioned in said interior space of said body portion.

9. The fruit cutting apparatus as in claim 1, wherein said rotating platform assembly includes a support platform coupled to a terminal end of said second portion of said rotating platform assembly, said prong being coupled to and extending away from said support platform.

10. The fruit cutting apparatus as in claim 1, wherein said second portion of said rotating platform assembly has a cylindrical configuration and is rotated relative to said first portion of said rotating platform assembly when actuated in association with said received user input data.

11. The fruit cutting apparatus as in claim 10, wherein said rotating platform assembly includes an auxiliary cutting member movable between a retracted configuration inside said second portion of the rotating platform assembly and an extended configuration extending upwardly and outside of said second portion of the rotating platform assembly.

12. A fruit cutting apparatus for cutting a spherical-shaped fruit piece, comprising:

an appliance housing that includes a bottom wall having a planar and horizontal surface and a body portion that extends upwardly from said bottom wall and that defines an interior space;

a cutting chamber having a continuous side wall that defines an interior area and that defines an open top and an open bottom;

a rotating platform assembly having a first portion coupled to said body portion of said appliance framework and a second portion extending upwardly from said first portion in communication with said interior area of said cutting chamber, said rotating platform assembly including a prong extending upwardly from said terminal end that is operable to impale the fruit piece;

a cutting blade slidably movable between a retracted configuration displaced from said interior area of said cutting member and a deployed configuration in communication with said interior area of said cutting chamber;

wherein said cutting blade is positioned in said interior space of said body portion when in said retracted configuration and is positioned in said interior area of said cutting chamber when in said deployed configuration;

a processor positioned in said interior space of said body portion;

a non-volatile memory in data communication with said processor and configured to store data and programming executable by said processor, wherein said data and said programming includes predetermined actuation instructions associated with a plurality of cutting styles;

an input assembly in data communication with said processor and configured to receive user input data associated with a respective cutting style; and programming stored in said non-volatile memory that, when executed by said processor, causes said processor to actuate said cutting blade and said rotatable platform according to said received user input data.

13. The fruit cutting apparatus as in claim 12, wherein said input assembly includes a touch screen or a keypad in electrical communication with said processor for receiving input data associated with a style of cutting.

14. The fruit cutting apparatus as in claim 12, wherein said input assembly includes a single selection button in electrical communication with said processor for receiving input data associated with a style of cutting.

15. The fruit cutting apparatus as in claim 12, wherein said input assembly includes a voice recognition module in electrical communication with said processor for receiving input data associated with a style of cutting.

16. The fruit cutting apparatus as in claim 12, wherein said input assembly is positioned on an exterior surface of said body portion of said appliance housing.

17. The fruit cutting apparatus as in claim 12, wherein said rotating platform assembly includes a support platform coupled to a terminal end of said second portion of said rotating platform assembly, said prong being coupled to and extending away from said support platform.

18. The fruit cutting apparatus as in claim 12, wherein said second portion of said rotating platform assembly has a cylindrical configuration and is rotated relative to said first portion of said rotating platform assembly when actuated in association with said received user input data.

19. The fruit cutting apparatus as in claim 18, wherein said rotating platform assembly includes an auxiliary cutting member movable between a retracted configuration inside said second portion of the rotating platform assembly and an extended configuration extending upwardly and outside of said second portion of the rotating platform assembly.

20. The fruit cutting apparatus as in claim 12, wherein said programming, when executed by said processor, causes said processor to actuate said cutting blade to cut said fruit piece into one of wedges, slices, cubes, rings, spirals, or slaw according to said received user input data.

* * * * *